United States Patent
Archambeau et al.

(12)

(10) Patent No.: US 6,279,131 B1
(45) Date of Patent: Aug. 21, 2001

(54) AUTOMATED TESTING SYSTEM WITH MINIMIZED DEPENDENCY ON SPECIFIC TEST INSTRUMENTS

(75) Inventors: Paula Marie Archambeau, Canal Winchester; James Michael Hajjar; Douglas Scott Mix, both of Pickerington, all of OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/521,553

(22) Filed: Aug. 30, 1995

(51) Int. Cl.[7] .................................................. G06F 11/00
(52) U.S. Cl. ............................................................ 714/737
(58) Field of Search ................................ 371/26, 25.1, 71; 324/171 R, 158 R; 364/487; 395/325; 714/737, 734, 736, 738, 724

(56) References Cited

U.S. PATENT DOCUMENTS 5,479,643 * 12/1995 Bhaskar et al. ...................... 395/500
5,566,088 * 10/1996 Herscher et al. ................. 364/514 B

* cited by examiner

*Primary Examiner*—Nadeem Iqbal
(74) *Attorney, Agent, or Firm*—C. L. Warren

(57) ABSTRACT

Programs which control conventional computerized test systems must be changed when a particular test instrument controlled by the system is changed to a different test instrument. In accord with this invention, the need for such program changes is minimized by utilizing a generic instrument interface for each class of test instruments. A separate specific instrument interface, which corresponds to the specific instrument to be utilized within the general class, is identified in accordance with global variables and a look-up table based upon the general instrument interface called for in the basic test program. A simulator interface is also provided to facilitate the debugging of a basic test program by generating simulated data responses as if an actual test instrument was connected.

6 Claims, 2 Drawing Sheets

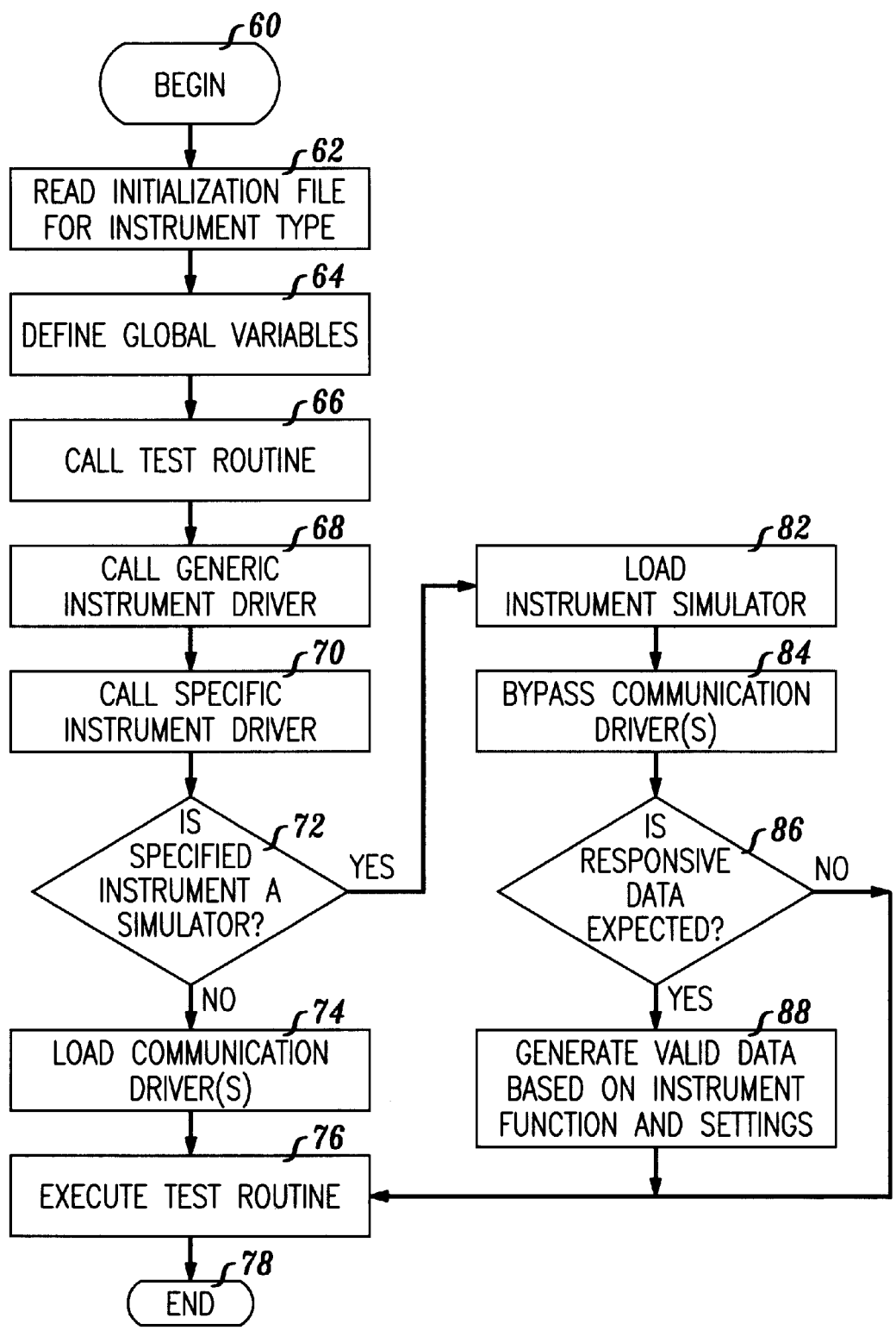

AUTOMATED TESTING SYSTEM WITH MINIMIZED DEPENDENCY ON SPECIFIC TEST INSTRUMENTS

BACKGROUND OF THE INVENTION

This invention is generally directed to the testing of electronic products by utilizing test equipment operating in response to instructions transmitted from a computerized test system. This invention more specifically addresses a computer controlled test system which minimizes the need to change a test program in response to a change of the specific test equipment to be used.

Test instruments operating in response to digital instructions generated by a personal computer (PC) facilitates the testing of electronic products connected to the test instruments. In a conventional system, a plurality of instructions are sent from the PC in accordance with predetermined program steps to particular test instruments in order to perform a test. The PC receives data from the test instruments indicative of the results of the test. Thus, the programming of the PC to implement such conventional test procedures depends on the specific test instruments to be utilized. Such a system provides generally good results with regard to testing electronic products as long as the specific test instruments for which the test system was originally programmed are utilized.

However, such test systems place significant burdens upon the test equipment designer when the test sequence has to be altered or when different test instruments have to be utilized which are not identical to the original test instruments. For example, the substitution of a digital multimeter manufactured by one vendor for a digital multimeter manufactured by a different vendor would typically require substantial revisions to the program, e.g. the sending of different instructions to the different multimeter and possibly the use of a different communication protocol to communicate with the different multimeter. This requires a substantial effort by the test equipment designer to merely accommodate the substitution of one multimeter with a different multimeter even though no functional changes were made in the testing of the electronic equipment.

Attempts have been made to improve the methodology by which computerized test routines are constructed. For example, National Instruments provides a software package known as "LabVIEW". This software is a graphical programming package in which icons are used to denote programs and subroutines. These icons are cascaded together to build an interface which will allow a particular test instrument to make a test or to cause the instrument to take an action. While such efforts have helped test designers in the design and development of test programs, significant difficulties still remain which impair the designer's ability to accommodate different test instruments.

SUMMARY OF THE INVENTION

It is an object of the present invention to minimize the above referenced problem of accommodating different test instruments in a computerized test system. In one aspect, the present invention facilitates the substitution of like types of specific test instruments within a common class of instruments without revising the basic test program which utilizes such instruments. A further aspect of the present invention permits a test designer to debug and test a test program without connecting the specific test instruments which will be utilized for actual testing.

In accordance with an embodiment of the present invention, a computer implemented method is provided which generates digital instructions wherein the basic test program is isolated from specific test instruments used to carry out the test. An electronic testing system includes test instruments remotely controllable by digital instructions. A computer controls the testing of electronic products by issuing digital instructions to the test instruments and receiving the results of the test from the test instruments. A generic type of test instrument is specified in a stored program defining a sequence of tests to be made on the electronic product. The generic type identifies a class of test instruments, e.g. a digital multimeter called by the test sequence, but does not specify a specific test instrument within the class. At least one variable stored in memory of the computer is read based on the generic type of instrument defined. The value of the variable identifies one specific instrument within the generic type of instruments. A communication protocol to be utilized by the specific test instrument is also preferably identified to facilitate the receipt of the digital instructions and the transmission of test data to the computer. Digital instructions are generated and transmitted to the one specific instrument utilizing the one communication protocol. Thus, a different specific instrument can be used to perform the one test by merely changing the one variable to correspond to a different specific instrument without changing the basic stored program which only references the generic type of instrument to be used.

BRIEF DESCRIPTION OF THE DRAWINGS

FIG. 3 is a flow diagram illustrating steps that implement an exemplary method in accordance with the present invention.

DETAILED DESCRIPTION

Figure 1:
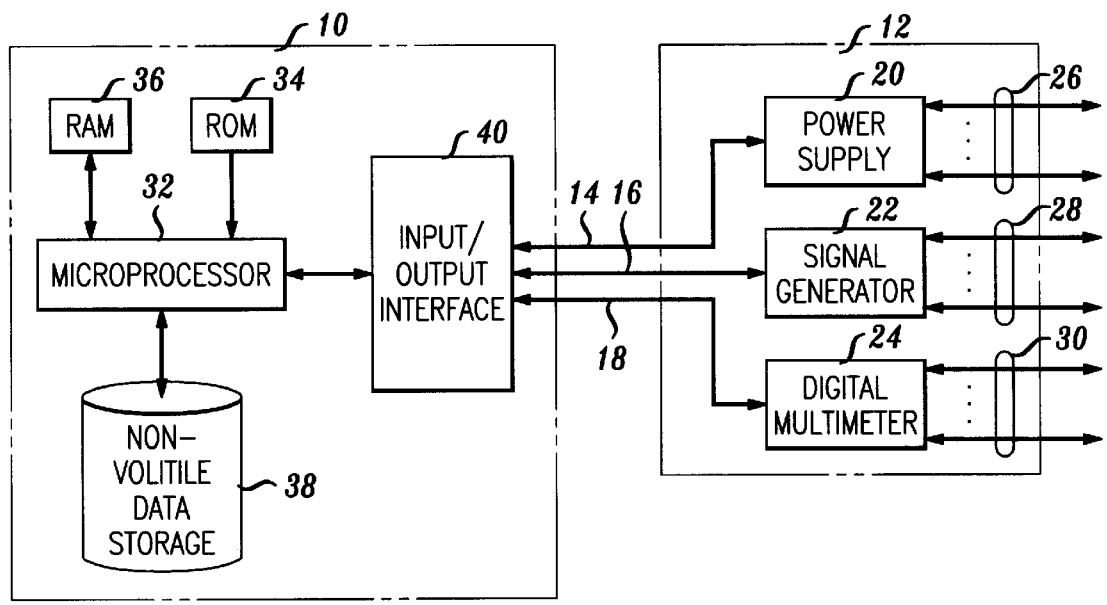
FIG. 1 is a block diagram illustrating a computer controlled test system in accordance with the present invention.

FIG. 1 illustrates a test system which includes a computer 10, test equipment 12, and communication channels 14, 16, and 18 which support communications between the computer 10 and the test instruments 12. Each of the test instruments is remotely controllable by commands received from computer 10 and are capable of supplying information, such as measured data, to computer 10. In the illustrative example, a power supply 20, a signal generator 22 and digital multimeter 24 comprise the test equipment 12 and include communication lines 26, 28, and 30, respectively, which are connected to the electronic product (not shown) to be tested. Such test instruments which are remotely controllable by and communicate with a computer or other device are commercially available from a variety of manufacturers.

A typical test sequence could comprise power supply 20 being commanded to supply needed operating voltage to the electronic product. A command to signal generator 22 could cause it to generate an appropriate test signal or input to the electronic product. The digital multimeter 24 could be commanded to read, that is, measure a voltage or waveform at a designated location in the electronic product which is anticipated to be present in response to the signal generated by signal generator 22. The digital multimeter would then generate digital data representative of the read voltage or waveform and transmit this information to the computer 10.

The computer 10 which may consist of a personal computer may include a microprocessor 32 coupled to read-only memory (ROM) 34, random access memory (RAM) 36 and a nonvolatile data storage device 38 such as a disk drive. An input/output interface device 40 is coupled to microprocessor 32 and provides an input/output interface permitting the processor 32 to communicate with communication channels 14, 16, and 18. It will be apparent to those skilled in the art that the computer 10 operates under the control of a stored program resident in its memory. Communications with the test instruments may require the use of different communication protocols since each of the instruments may be made by a different manufacturer or consist of a different model.

Figure 2:
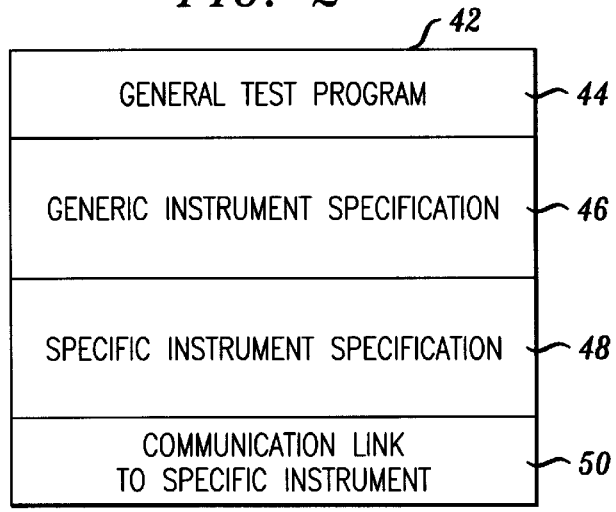
FIG. 2 is a graphical representation illustrating the hierarchical relationship of program components in accordance with an embodiment of the present invention.

FIG. 2 illustrates a hierarchical structure 42 in accordance with an embodiment of the present invention by which computer 10 controls the testing of electronic products. A general test program 44 defines the test sequence of the electronic product to be tested by defining required actions to be initiated by test instruments and information or data to be received from the test instruments. The general test program 44 references generic instrument specifications 46 which define the general classes of test instruments. For example, general classes of test instruments may include power supplies, signal generators, digital multimeters, oscilloscopes, etc. The general test program 44 identifies a generic instrument specification 46 as required to take a required action as part of a test sequence. The generic instrument specification 46 will in turn identify a specific instrument specification 48 which defines a specific instrument of the general class of instruments. The identification of the specific instrument specification 48 is made by means of a stored preprogrammed look-up table of parameters which identifies for each generic instrument specification a particular instrument specification to be utilized. For example, a specific instrument specification may identify a particular manufacturer's model digital multimeter which is within the generic instrument specification of a digital multimeter. The specific instrument specification 48 will preferably define a particular communication link 50 for the corresponding specific instrument. The identification of the communication link is likewise contained in the look-up table and is used since different specific instruments may require different types of communication protocols and signals.

It is an important aspect in accordance with an embodiment of the present invention to separate the specific data required for a specific instrument specification 48 from the general test program 44. This is generally accomplished by utilizing the generic instrument specifications which are linked by the look-up table to particular instruments. This permits a test designer to generate a general test program by making reference to the generic instrument specification 46 without having to know the specific manufacturer and model of the type of instrument which will be utilized to carry out the test. The specific instrument to be utilized is identified in the predetermined look-up table. By changing the predetermined data in the look-up table to reference a different model of test instrument, test instrument substitutions can be made without modification of the general test program. This provides flexibility in the utilization of different test instruments which may be required to be used at different locations or where a test instrument must be replaced by a different model of the same class of test instruments. Such flexibility minimizes the amount of changes to the test program required by the test designer to accommodate changes in specific test equipment.

FIG. 3 is a flow diagram of steps in accordance with an illustrative embodiment of the present invention. Starting at BEGIN 60, an initialization file containing information for each test instrument type used in the test sequence is read as indicated in step 62. The initialization file information defines for each specific test instrument, the model of the instrument, the communication protocol used by the instrument, and a computer address or port identification through which communications with the instrument are supported. In step 64 global variables associated with the test program are defined based on the information read from the initialization file. In step 66 a test routine or program is called. A generic instrument driver, (e.g. a digital multimeter) associated with the called test routine is in turn called in step 68. In step 70 (e.g. DMM1) a specific instrument driver is called based upon the generic instrument driver defined in step 68 and on the global variables associated with the generic instrument driver. A decision is made in step 72 as to whether the specific instrument driver is a simulator. A simulator consists of a separate routine which emulates the presence of the type of test instrument which will be used to implement actual tests. The simulator may be called as opposed to a specified instrument for purposes of program debugging and verification. One important benefit of using the simulator is that a corresponding test instrument need not be connected to the test system in order to execute a test program. Assuming a simulator is not specified as determined in step 72, i.e. a "NO" decision, communication drivers are loaded as indicated in step 74. Based on global variables associated with a specific instrument driver, one of the communication protocols in commercial use will be called as the communication driver to facilitate communication with the corresponding test instrument. In step 76 the test program or routine is executed. The execution of the test routine will normally comprise the sending of a series of commands as digital words or numbers to corresponding test instruments and receiving information (data) indicative of test results from the test instruments. Further, the test routine will normally compare the test data received from the test instruments with a stored predetermined range of expected results to determine whether the electronic product is operating within this range. Such a comparison will normally lead to a determination as to whether the electronic product passes or fails a corresponding test. The routine terminates at END step 78.

If a simulator is specified as determined in step 72, i.e. a "YES" determination, a simulator of the class of the test instrument is loaded as indicated in step 82 based upon the generic instrument driver specified and the corresponding global variables. All communication drivers are bypassed, i.e. not utilized, as indicated in step 84. This prevents the test program from attempting to send commands over a communication channel to a test instrument which is not ready or does not exist. It prevents potential errors during the execution of the test program since no data or no appropriate data will be received on communication lines which would have been associated with an actual instrument. A determination is made in step 86 as to whether or not data would be expected if an actual test instrument instead of the simulator had been selected. If a determination is made that data is not expected, then the process continues at step 76 with the execution of the test routine. If data is expected as indicated by a YES determination in step 86, valid data based upon the instrument function and settings is generated as indicated in step 88. For example, if a voltage reading within the range of 2–2.4 volts dc was anticipated as a valid reading, the simulator would identify the valid range and generate a data response within the indicated range. This could be accomplished with a random number generator utilizing the range extremes as end points to define a number to be generated; could simply be a number representing an arithmetic average of the valid range; or could be a predetermined, stored number. Following step 88 the process continues with the execution of the test routine as indicated at step 76.

A more specific example of the operation of an embodiment of the present invention is presented below. This example addresses the use of a digital multimeter which is to be utilized as a test instrument to test an electronic product under the control of a test computer 10. The generic definition of the digital multimeter class includes five functions shown below in Table 1.

TABLE 1

| Multimeter Functions | Sub-Functions |
| --- | --- |
| Initialize | . |
| Configure Measurement | 1-Function |
| | 2-Range |
| | 3-Resolution |
| | 4-Filter |
| | 5-Auto Zero |
| Configure Trigger | . |
| Read Measurement Data | . |
| Close | . |

The digtal multimeter functions include Initialize, Configure Measurement, Configure Trigger, Read Measurement Data and Close. In this illustrative example, sub-functions are shown for the Configure Measurement function. It will be understood that each of the other functions contain corresponding sub-functions which will be the same sub-functions for all digital multimeters. This permits a predetermined correspondence of actions to be specified which will be the same for all multimeters. In the illustrative example, the Configure Measurement function includes sub-functions of: function, range, resolution, filter, and auto zero. These five sub-functions will exist for all multimeters in the multimeter class.

The following Table 2 illustrates for each of the sub-functions shown in Table 1 various capabilities for digital multimeters DMM1 and DMM2 which may represent multimeters of different manufacturers and/or different models of multimeters.

TABLE 2

| Multimeter Sub-Functions | DMM1 | DMM2 |
| --- | --- | --- |
| Function | 0-DC Volts-Default | 0-DC Volts-Default |
| | 1-AC Volts | 1-AC Volts |
| | 2-2 Wire 0 hms | 2-2 Wire 0 hms |
| | 3-4 Wire 0 hms | 3-4 Wire 0 hms |
| | 4-DC Current | 4-DC Current |
| | 5-AC Current | 5-AC Current |
| | 6-Frequency | |
| | 7-Period | |
| | 8-Continuity | |
| | 9-Diode Checking | |
| | 10-Vdc:Vdc Ration | |
| Range | 0-Auto Range-Default | 0-Auto Range-Default |
| | Else Enter Max Value | Else Enter Max Value |
| | To Be Measured | To Be Measured |
| Resolution | 0-Default | 0-Default |
| | 1–4 Digits | 1–4 Digits |
| | 2–5 Digits | 2–5 Digits |
| | 3–6 Digits | 3–6 Digits |
| | 4–7 Digits | 4–7 Digits |
| Filter | 0-Default (Medium) | 0-Off (Default) |

TABLE 2-continued

| Multimeter Sub-Functions | DMM1 | DMM2 |
| --- | --- | --- |
| | 1-Low | 1-On |
| | 2-Medium | 2-On |
| | 3-High | 3-On |
| Auto Zero | False-Off (Default) | False-Off (Default) |
| | True-On | True-On |

It will be observed that the same capabilities between the two digital multimeters are represented by identical listings of capabilities for some sub-functions, e.g. the Range, Resolution, and Auto-Zero sub-functions. It will be apparent that other sub-functions, e.g. the Function and Filter sub-functions, indicate different capabilities of the two respective multimeters. Since DMM2 contains the same 0–5 capabilities as DMM1 for the sub-function "Function", either multimeter could be utilized to perform these measurements. However, DMM1 contains additional capabilities 6–10 which could be utilized for measurements. If DMM2 were substituted for DMM1, and if one of the Function capabilities 6–10 of DMM1 had been utilized, the DMM2 instrument would not be capable of such action. The settings of the sub-functions define the actions to be taken by the specified digital multimeter. The settings of the sub-functions are determined by parameters contained in the basic test program which are transmitted to the specified test instrument on execution of the test program. In the event of a substituted digital multimeter which does not contain a corresponding sub-function, the preferred embodiment of the invention provides additional error checking to determine if a sub-function (such as 6–10) has been specified but cannot be accomplished by a different specific digital multimeter (DMM2). This error checking will alert the test designer that either another instrument will be required to conduct this test or that an alternate test using available functionality of the selected instrument will be required.

Since many of the instruments contain basic functionality (sub-functions) which are most often used, many of the tests to be executed by the test program need not be altered because a different test instrument will be utilized than was originally intended during the design of the test program. This minimizes the need to alter the basic test program to accommodate different test instruments.

It will be apparent to those skilled in the art that this technique explained with regard to digital multimeters is equally applicable to other general classes of instruments such as power supplies, signal generators, oscilloscopes, etc. This technique in accordance with the present invention minimizes the need to alter basic test programs to accommodate a change of specific test instruments to carry out the test.

Although an embodiment of the invention has been described above and shown in the accompanying drawings, the scope of the invention is defined by the claims which follow.

The invention claimed is:

1. In a system for testing electronic products, the system including test instruments remotely controllable by digital instructions and coupled to the electronic products, and a computer that controls the testing of the products by issuing the digital instructions to the test instruments and receiving results from the test instruments based on the digital instructions, a computer implemented method for generating the digital instructions so that a test sequence in a stored program defining tests to be performed are isolated from identification of specific test instruments used to carry out the tests, the method comprising the steps of:

a) specifying a generic type of test instrument to make at least one test as part of the stored program defining the test sequence to be made of the electronic product, said generic type identifying a class of test instruments to make said one test but not a specific test instrument of said class;

b) reading one variable stored in memory of said computer identified by said specified generic type, said one variable identifying one specific instrument of said generic type to make said one test;

c) generating and transmitting at least a first digital instruction to said one specific instrument based on said one variable, said first digital instruction corresponding to said one test to be made by said one specific instrument, changing said one variable to correspond to a different specific instrument enables substitution of the different specific instrument for the one specific instrument without changing the test sequence in the stored program.

2. The method according to claim 1 wherein said reading step comprises the step of reading said one variable from a table of variables stored in the memory.

3. In a system for testing electronic products, the system including test instruments remotely controllable by digital instructions and coupled to the electronic products, and a computer that controls the testing of the products by issuing the digital instructions to the test instruments and receiving results from the test instruments based on the digital instructions, a computer implemented method for generating the digital instructions so that a test sequence in a stored program defining tests to be performed are isolated from identification of specific test instruments used to carry out the tests, the method comprising the steps of:

a) specifying a generic type of test instrument to make at least one test as part of the stored program defining the test sequence to be made of the electronic product, said generic type identifying a class of test instruments to make said one test but not a specific test instrument of said class;

b) reading one variable stored in memory of said computer identified by said specified generic type, said one variable identifying a simulator implemented by the computer to simulate a specific instrument;

c) determining if data is expected to be received in response to said one test;

d) if data is determined to be expected in response to said one test, generating a valid simulation value to simulate valid data in response to said one test, computer implemented simulator enables said test sequence of the stored program to be executed without a specific test instrument being coupled to said computer.

4. The method according to claim 3 wherein said reading step comprises the step of reading said one variable from a table of variables stored in the memory.

5. A computer implemented system for testing electronic products where test instruments coupled to the electronic products are remotely controlled by digital instructions received from the system, the system receives results from the test instruments based on the digital instructions, the system comprising:

a) program means for specifying a generic type of test instrument to make at least one test as part of a stored program defining a test sequence to be made of the electronic product, said generic type identifying a class of test instruments to make said one test but not a specific test instrument of said class;

b) means for reading one variable stored in memory of said system identified by said specified generic type, said one variable identifying one specific instrument of said generic type to make said one test;

c) means for generating and transmitting at least a first digital instruction to said one specific instrument based on said one variable, said first digital instruction corresponding to said one test to be made by said one specific instrument, said program means and reading means cooperating to enable substitution of a different specific instrument for the one specific instrument without changing the test sequence in the stored program.

6. The system according to claim 5 wherein said reading means reads said one variable from a table of variables stored in the memory.

* * * * *